April 18, 1944.   W. A. SHURCLIFF   2,347,067
SPECTROPHOTOMETER ATTACHMENT FOR ABSORBING SPECULAR REFLECTION
Filed Feb. 13, 1942
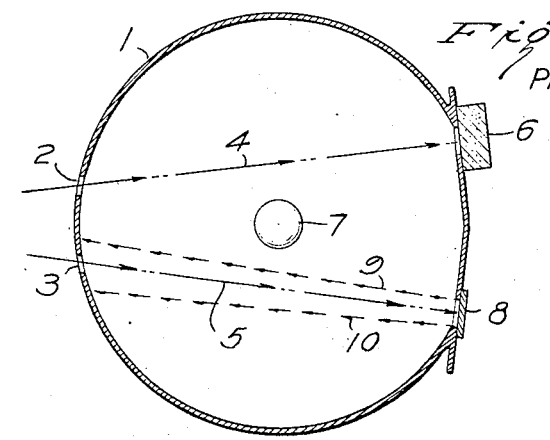
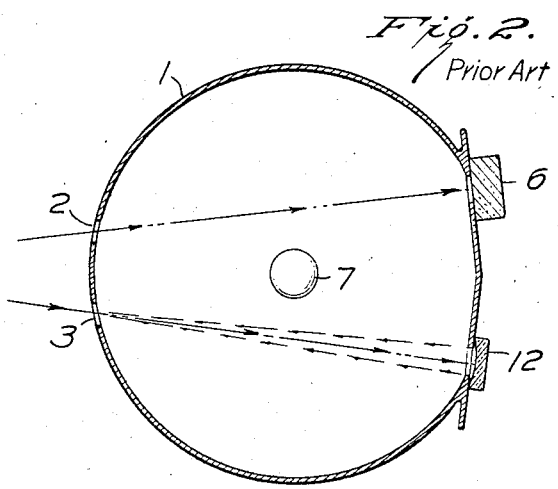
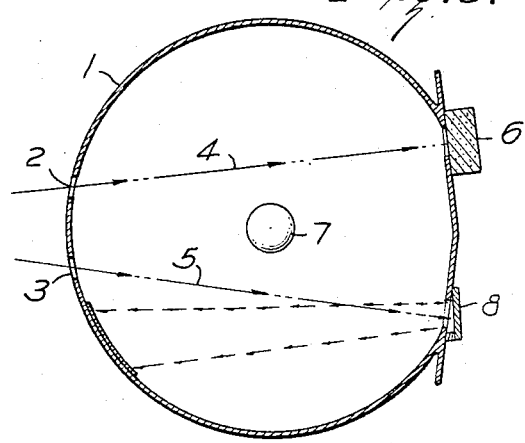
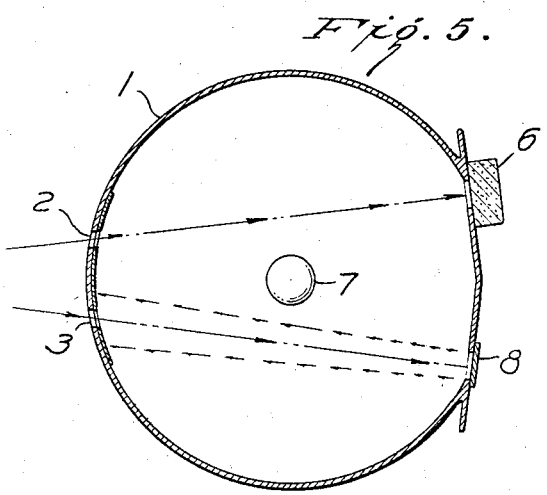
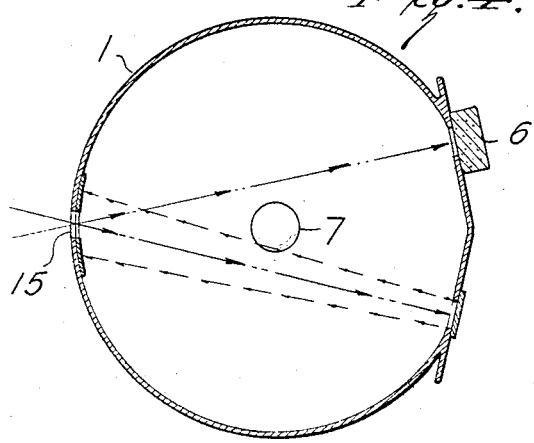
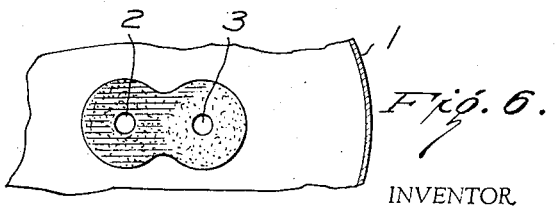
INVENTOR
WILLIAM A. SHURCLIFF
BY Elmer W. Harmon
ATTORNEY.

Patented Apr. 18, 1944

2,347,067

UNITED STATES PATENT OFFICE 2,347,067

SPECTROPHOTOMETER ATTACHMENT FOR ABSORBING SPECULAR REFLECTION

William A. Shurcliff, Plainfield, N. J., assignor to American Cyanamid Company, New York, N. Y., a corporation of Maine Application February 13, 1942, Serial No. 430,720

3 Claims. (Cl. 88—14)

This invention relates to spectrophotometric measurement of reflectance particularly to the measurement of the body reflectance, of specularly reflecting samples.

In the past considerable information with regard to the composition of various samples has been obtainable through the use of flickering-beam type recording spectrophotometers. Examples of such spectrophotometers are well illustrated in U. S. Letters Patent No. 2,107,836 and 2,126,410 issued on February 8, 1938, and August 9, 1938, respectively, to Orrin W. Pineo. Even the best of such spectrophotometers, however, will not give immediately useful readings with samples having a high gloss such as hard finished papers, certain inks, lacquers, paints, molded resins, ceramics and others exhibiting similar phenomena. It is usually desirable to determine the body reflectance dependent upon the structure or composition of the material itself rather than the total reflectance which is obtained when a sample is run in a conventional type apparatus. In the case of samples where there is an appreciable surface gloss, specularly reflected light may comprise a large or even a major proportion of the total reflectance of the sample at a given wave-length.

In addition, it should be brought out that in most circumstances there is a certain minimum below which the total reflectance will never fall however low the body reflectance. For example, with plastics such as "Bakelite" this minimum usually occurs somewhere at about 4%. Therefore, when only the body reflectance is desired the readings obtained from a conventional type apparatus with the sample held in the conventional manner may be in error by 4% or more even with a very light sample. With dark samples the error will often be appreciably more than 50%. It will therefore be apparent that for many purposes the elimination of this surface reflectance becomes highly important.

There are two principal methods of eliminating the effect of specularly reflected light on the reading obtained with the spectrophotometer. The first of these is to reject the specularly reflected light coming from the surface of the sample from the interior of the integrating sphere. The second of these comprises the provision of some means within the integrating sphere for eliminating the effect of specular reflectance.

The present invention in general relates to the second of these procedures, namely that of providing means within the integrating sphere for eliminating the effect of light which is specularly reflected from the sample. The provision of means for rejecting specularly reflected light from the sphere is disclosed in my copending application Serial No. 430,718 filed of even date. This object is accomplished by providing a mask capable of absorbing the surface reflected light which may be inserted within the integrating sphere, whenever it is desired to make measurements in which the specular reflectance is to be discarded.

The invention will be discussed in conjunction with the drawing in which:

Figure 1 is a partially diagrammatic section representing a conventional integrating sphere showing a specularly reflecting sample and reference sample in place;

Figure 2 represents a modification in which the specularly reflecting sample is curved so that specularly reflecting light will pass out through the entrance window;

Figures 3, 4 and 5 represent different modifications of specular light absorbing masks.

Figure 6 represents another view of the mask of Figure 5.

Referring to Figure 1, 1 represents the integrating sphere of a conventional flickering-beam type spectrophotometer having two entrance windows 2 and 3 through which enter the divergent beams of light represented by the lines 4 and 5. The source of these beams forms no part of the present invention, is conventional and is not shown. The beam 4 falls upon the standard reflectance sample 6, of magnesium carbonate or the like, and is diffusely reflected into the interior of the sphere, being picked up by a phototube or photocell 7 in the conventional manner.

The beam 5 is represented as falling normally upon a sample 8. A part of the light will be specularly reflected from the plane surface of the sample as represented by the lines 9 and 10, fall upon the surface of the integrating sphere and be picked up by the light receiving device. The remainder of the beam 5 will be diffusely reflected in the same manner as is the light from the reference sample. Since it is one of the purposes of the present invention to provide a means whereby only the diffusely reflected light is to be compared with the total diffused reflectance from the reference sample, the diagram will serve to emphasize the type of objectionable reflectance which it is desired to eliminate. As will be seen from Figure 1 this is not done in a conventional type machine using the conventional sample mounting.

Figure 2 illustrates one means whereby the effect of the specularly reflected light may be eliminated. This comprises forming the surface of the sample 12 into a curve such that it will focus all the specularly reflected light upon the entrance window 3 whereby it will pass from the integrating sphere and will not cause an inaccurate measurement.

While this modification can be made to give fairly accurate results it has several serious drawbacks. First it requires that the sample be capable of having its surface deformed in the necessary curve. Many substances are not so adaptable. Secondly, the curve must be very accurately formed and the sample very accurately placed, otherwise, it will focus the specularly reflected light upon a reflecting portion of the interior surface of the sphere and cause an abnormally high total reflectance reading since under normal conditions a certain amount of the light reflected from the surface of the sample would have passed out through one or the other of the entrance windows 2 and 3.

Figure 3 shows one modification of the invention in which a light absorbing mask is positioned on the interior surface of the sphere to absorb the light specularly reflected from the sample. While the result obtained by this means will be better than if no attempt was made to compensate for the specular reflectance, the result is not as good as might be desired. First the sample must be tilted in order to direct the specularly reflected light to the mask which will result in an abnormal reflectance since the incident beam will no longer be normal to the sample surface and the reflectance is a function of the angle of incidence. As a second consideration, the placing of a black object on one side has destroyed the symmetry of the sphere and therefore prevented it from giving a true reading. Placing a similar light absorbing surface of equal area on the opposite side of the sphere will restore the symmetry but will not overcome the errors caused by tilting the sample.

Figure 4 shows one preferred embodiment of the invention applicable to a spectrophotometer having only a single entrance window 15 admitting both the reference and sample beams. A mask is placed symmetrically around the window opening. This embodiment is very efficient since it causes an almost complete absorption of the specularly reflected light while necessitating only a small decrease in the reflecting surface of the integrating sphere.

Figure 5 represents another of the preferred embodiments of the present invention. It may be employed without changing the structure of the integrating sphere. A mask of light absorbing material is placed around both the entrance window openings. Light which has been specularly reflected from the surface of a sample as in Figure 1 will be received and absorbed by the mask and will not reach the phototube. The mask should be placed around both the window openings in a symmetrical manner. The exact shape of the mask is not particularly critical so long as the placement is sufficiently symmetrical so that the reflecting areas of both halves of the integrating sphere are equal. One such shape which has produced excellent results is shown in Figure 6.

The material of which the light absorbing mask may be made is not of primary importance. So long as it has a light absorbing surface of high efficiency, the other characteristics are not important. I have found that a mask of black velvet material mounted upon a suitable backing of metal, cardboard or the like produces excellent results. While it is not absolutely essential that a mask be formed to fit the interior surface of the sphere, I have found that it is well to do so.

The use of this invention may require a modification in the structure of many integrating spheres now in use. In order to place the mask in the proper position it is necessary to open the sphere. Not all the integrating spheres in use are so constructed that they may be opened. There is however, no great difficulty in so modifying these structures so this may be carried out.

While the drawing has illustrated several possible embodiments of the present invention, it is not meant to limit the scope of the invention. Other modifications may appear to one skilled in the art and are not to be excluded from the scope of the invention since the drawing is merely meant to be illustrative and not to limit the possible arrangements of the absorbing surfaces.

Although the discussion has been principally concerned with masks detachable from the sphere, the invention is not meant to be so limited. While the reflecting surface of the sphere is reduced by the presence of the mask, if there are many samples to be tested using the mask its advantage is sufficiently great to overcome the loss in sphere efficiency in connection with those samples where it is not needed and it may be desirable to install a permanent mask.

In my copending application Serial No. 430,718, filed of even date, I have disclosed the use of an adapter and a film of oil to reject the specularly reflected light from the sphere. In that application the adapters are limited to a curved surface capable of concentrating the specularly reflected light on an opening in the sphere surface. Since the reason for focusing on an opening was that the opening did not reflect, the masks of the present invention are also useful with adapters of similar nature capable of concentrating the spectral reflectance on the mask.

Also in the same application the oil film was disclosed as adapted to permit the testing of scratched, matte, rough-ground and other similar samples having an irregular surface. By using a mask such as that disclosed in Figures 5 and 6 of the present application similar irregular samples may be tested using a flat adapter and a film of oil interposed between the sample and adapter to seal the joint. Specularly reflected light from the adapter surface will be absorbed by the mask in the same manner as light from the sample itself in Figure 5.

I claim:

1. In a spectrophotometer of the flickering-beam type, the combination of an integrating sphere having openings in the sphere to admit light to the interior of said sphere and reflectance sample windows opposite said openings with a light-absorbing mask on the inner surface of said sphere, immediately adjacent and symmetrically positioned about said openings.

2. In a spectrophotometer of the flickering-beam type, the combination of an integrating sphere having an opening in the sphere to admit light to the interior of said sphere and reflectance sample windows opposite said opening with a light-absorbing mask on the inner surface of said sphere, immediately adjacent and symmetrically positioned about said opening.

3. In a spectrophotometer of the flickering beam type, the combination of an integrating chamber having means therein to admit light to the interior of said chamber and reflectance chamber windows opposite said means with a light absorbing mask on the inner surface of said chamber, immediately adjacent to and symmetrically positioned about said light-admitting means.

WILLIAM A. SHURCLIFF.